No. 683,602. Patented Oct. 1, 1901.
W. F. HODGE.
SEAT SUPPORT.
(Application filed Aug. 6, 1900.)
(No Model.)
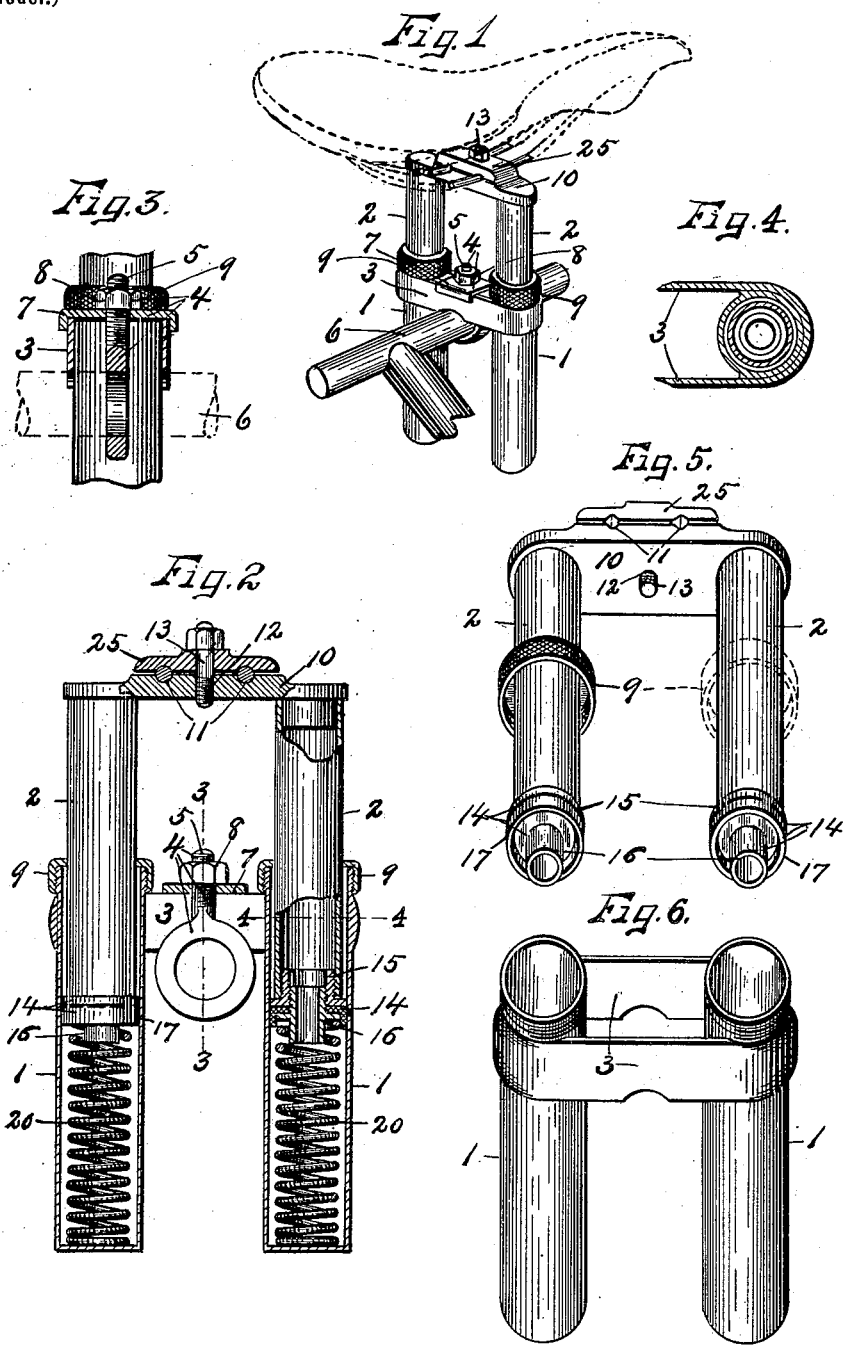
WITNESSES:
INVENTOR
William F. Hodge
BY
Smith & Davidson
ATTORNEYS.

UNITED STATES PATENT OFFICE.

WILLIAM F. HODGE, OF SYRACUSE, NEW YORK.

SEAT-SUPPORT.

SPECIFICATION forming part of Letters Patent No. 683,602, dated October 1, 1901.

Application filed August 6, 1900. Serial No. 26,044. (No model.)

*To all whom it may concern:*

Be it known that I, WILLIAM F. HODGE, of Syracuse, in the county of Onondaga, in the State of New York, have invented new and useful Improvements in Seat-Supports, of which the following, taken in connection with the accompanying drawings, is a full, clear, and exact description.

This invention relates to improvements in seat-supports, consisting of an attachment for bicycles and similar vehicles as a new article of manufacture.

The object of this invention is to produce a pneumatic or hydraulic device which may be readily and economically attached to any form of bicycle or other velocipede for the purpose of yieldingly supporting a seat or saddle, and thereby obviating all liability of injury to the rider or undue strain of the seat-support when the vehicle is passing over uneven surfaces or obstructions; and to this end the invention consists in the combination, arrangement, and construction of the component parts of a seat-support, as hereinafter fully described, and pointed out in the claims.

Referring to the drawings, Figure 1 is a perspective view of my invention shown as operatively mounted on an ordinary seat-post, the seat or saddle being shown in dotted lines. Fig. 2 is a face view, partly in section, of my invention as seen in Fig. 1. Figs. 3 and 4 are sectional views taken, respectively, on lines 3 3 and 4 4, Fig. 2. Figs. 5 and 6 are isometric views, respectively, of the upper and lower telescopic sections seen in Figs. 1 and 2.

It is well known to those skilled in this art that various means have been employed for effecting the desired result above referred to and that the most effective devices of this character are constructed as a part of the vehicle and necessitate considerable expense for repairs when the parts become worn or otherwise rendered unfit for use. It is further known that a large number of bicycles and similar velocipedes now in use and being manufactured are unprovided with suitable and elastic seat-supports, and in order to provide a resilient and effective seat-support which may be readily placed in operative position upon any bicycle or other velocipede and removable therefrom when desired I employ one or more pneumatic cylinders 1 and one or more plungers 2, which when in use are adapted to compress the air within said cylinders and form substantially an air-cushion for supporting the seat. The cylinders 1 may be of any desired form or construction, are preferably united to each other by a yoke or bar 3, and are provided with clamping means 4 for firmly holding said cylinder or cylinders in operative position. When used in connection with a bicycle, this clamping means usually consists of a clamping-bolt 5, having one end provided with an eye for receiving a suitable seat-post 6, its other end being threaded and adapted to receive a clamping-plate 7 and a nut 8.

The yoke 3 is preferably secured by brazing or other means to the upper ends of the cylinders 1 and is provided with a substantially central vertical opening for receiving the clamping-bolt 5, previously mentioned, and is also formed with cut-outs extending upwardly from its lower face and alined with the eye in the bolt 5 for engaging the upper face of the seat-post 6, previously mentioned. The clamping-plate 7 preferably engages the upper face of the yoke 3 and is provided with a central aperture for receiving the threaded end of the bolt 5, said clamping-plate 7, the eye 5, and the nut 8 serving to force the yoke 3 into engagement with the seat-post for firmly holding the cylinders 1 in operative position.

The cylinders 1 are preferably closed at their lower ends and their upper ends usually extend above the yoke 3 and are provided with peripheral threads for receiving suitable threaded caps 9, which are provided with apertures alined with the chambers of the cylinders and serve to guide the plungers 2, hereinafter described. Although the above-described means for holding the cylinders in operative position is particularly effective and economical in manufacture, it will be understood that any other equivalent or equivalents may be used, if desired, the essential purpose being to permit the seat-support to be readily attached to or detached from any form of bicycle or other velocipede when desired.

The plungers 2 may be of any desired form or construction, are preferably united to each other at their upper ends, and their lower ends are reciprocally movable within the cylinders 1. The means for uniting the upper ends of the plungers preferably consist of a transverse bar 10, which is provided with cut-outs 11 for receiving portions of the frame of a seat or saddle and is provided with a substantially central threaded aperture 12 for receiving a clamping-bolt 13.

The lower ends of the plungers 2, as previously stated, are movable in the cylinders 1 and are provided with piston-heads 14, adapted to closely fit the interior of the cylinders for the purpose of compressing the air therein. These piston-heads are preferably detachable from the plungers 2 and consist of hollow bushings 15, detachably secured to the lower ends of the plungers 2, nipples 16, detachably secured within the bushings 15, and flexible packings 17, interposed between the bushings 15 and nipples 16 and adapted to engage the inner surfaces of the cylinders 1. The plungers 2 are preferably formed hollow and communicate through the hollow bushings 15 and nipples 16 with the interior of the cylinders 1 for the purpose of increasing the volume of air adapted to be compressed within said cylinders and plungers. Each of the caps 9 surrounds the adjacent plunger 2 and is detachably engaged with the upper ends of the cylinders for permitting the plungers to be withdrawn from the cylinders when desired.

Any suitable means may be employed for normally holding the plungers 2 in their elevated position. This means preferably consists of springs 20, which are arranged within the cylinders 1 between the lower end walls of said eyes and the end faces of the plungers 2.

The means for securing the saddle in position preferably consists of the bolt 13 and a clamping-plate 25, said clamping-plate being usually provided with recesses alined with the cut-outs 11 and adapted to engage the upper faces of the frame of the saddle. Although this clamping means is shown as used in connection with a particular form of frame, it is evident that any other clamping means may be employed to conform with the frame of the seat or saddle, which may be mounted on the plungers 2.

In the operation of my invention the springs 20 serve the purpose of forcing and normally holding the plungers 2 in their elevated position and also act as buffers when the device is in use.

It is evident that when the plungers are depressed within the cylinders 1 the air within said cylinders and plungers is compressed, and thereby constitutes an air-cushion for yieldingly supporting the rider. It is therefore evident that when undue pressure is applied to the plungers, as in passing over obstructions, the springs relieve the compression of air and consequent strain upon the cylinder.

The operation of my invention will now be readily understood upon reference to the foregoing description and the accompanying drawings, and it will be noted that considerable change may be made in the detail construction and arrangement of the various parts of this invention without departing from the spirit thereof. Therefore I do not limit myself to the precise construction and arrangement shown and described.

Having thus fully described my invention, what I claim as new, and desire to secure by Letters Patent, is—

1. In combination with a support, two or more cylinders having closed upper ends united to each other and provided with clamping means for securing the same to said support, hollow plungers having corresponding ends closed and united to each other and their opposite ends open and provided with hollow pistons movable in said cylinders, hollow bushings for securing the pistons to the plungers, a seat, and additional clamping means provided on the closed ends of said plungers for securing the seat to the plungers.

2. In combination with a support, two or more cylinders having corresponding ends open and rigidly united to each other and their opposite ends closed, clamping means for detachably securing the cylinders to the support, hollow plungers having corresponding ends closed and rigidly united to each other, and their opposite ends open and provided with hollow pistons movable in said cylinders, hollow bushings for securing said pistons to the plungers, said plungers being removable from the cylinders, a seat, and additional clamping means for detachably securing the seat to the plungers.

In witness whereof I have hereunto set my hand this 1st day of August, 1900.

WILLIAM F. HODGE.

Witnesses:
H. E. CHASE,
HOWARD P. DENISON.